US009771719B2

(12) United States Patent
Kim et al.

(10) Patent No.: US 9,771,719 B2
(45) Date of Patent: Sep. 26, 2017

(54) SOLAR CELL MODULE-EQUIPPED PANEL AND EXTERIOR BUILDING MATERIAL USING SAME

(71) Applicant: ROSER CO., LTD, Gyoungsan-si (KR)

(72) Inventors: Yee Haeng Kim, Daegu-si (KR); Woo Kyoung Kim, Daegu-si (KR); Mi Sol Oh, Gyeongju-si (KR); Jun Hyun Park, Gumi-si (KR)

(73) Assignee: ROSER CO., LTD, Gyoungsan-si (KR)

( * ) Notice: Subject to any disclaimer, the term of this patent is extended or adjusted under 35 U.S.C. 154(b) by 88 days.

(21) Appl. No.: 14/760,049

(22) PCT Filed: Jan. 8, 2014

(86) PCT No.: PCT/KR2014/000192
§ 371 (c)(1),
(2) Date: Jul. 9, 2015

(87) PCT Pub. No.: WO2014/109541
PCT Pub. Date: Jul. 17, 2014

(65) Prior Publication Data
US 2015/0340990 A1 Nov. 26, 2015

(30) Foreign Application Priority Data

Jan. 10, 2013 (KR) .................. 10-2013-0003123
Jan. 14, 2013 (KR) .................. 10-2013-0004165

(51) Int. Cl.
*H02S 30/10* (2014.01)
*H02S 40/34* (2014.01)
(Continued)

(52) U.S. Cl.
CPC ............... *E04D 1/125* (2013.01); *E04D 1/18* (2013.01); *E04F 13/0848* (2013.01);
(Continued)

(58) Field of Classification Search
CPC .......... H02S 20/22; H02S 20/23; H02S 20/24; H02S 20/25; H02S 20/26; H02S 40/36;
(Continued)

(56) References Cited

U.S. PATENT DOCUMENTS 6,128,868 A * 10/2000 Ohtsuka .................. E04D 1/365
136/251
6,182,403 B1 * 2/2001 Mimura .................. E04D 3/362
126/621
(Continued)

FOREIGN PATENT DOCUMENTS

JP 11093346 4/1999
JP 11261095 A * 9/1999
(Continued)

OTHER PUBLICATIONS

Machine translation of JP11-261095A.*
International Search Report—PCT/KR2014/000192 dated Mar. 10, 2014.

*Primary Examiner* — Eric R Smith
(74) *Attorney, Agent, or Firm* — Cantor Colburn LLP

(57) ABSTRACT

A panel equipped with a solar cell module and an exterior material for a building using the same are provided. The panel equipped with a solar cell module includes a body section having a fixing part on one corner thereof, an attachment section having first and second attachment parts, the first attachment part being bent upwards from two sides of the body section adjacent to the fixing part, and the second attachment part being bent downwards from the opposite two sides of the body section separated from the fixing part, and a solar cell module attached on an upper surface of the body section.

3 Claims, 13 Drawing Sheets

(51) Int. Cl.
*H02S 20/26* (2014.01)
*H02S 40/36* (2014.01)
*H02S 20/23* (2014.01)
*E04D 1/12* (2006.01)
*E04F 13/08* (2006.01)
*E04F 13/12* (2006.01)
*E04D 1/18* (2006.01)

(52) U.S. Cl.
CPC .......... *E04F 13/0864* (2013.01); *E04F 13/12* (2013.01); *H02S 20/23* (2014.12); *H02S 20/26* (2014.12); *H02S 30/10* (2014.12); *H02S 40/34* (2014.12); *H02S 40/36* (2014.12); *Y02B 10/12* (2013.01)

(58) Field of Classification Search
CPC ....... E04F 13/864; F24J 2/0444–2/0455; F24J 2002/0053
See application file for complete search history.

(56) References Cited

U.S. PATENT DOCUMENTS

| | | | |
|---|---|---|---|
| 2003/0154666 A1* | 8/2003 | Dinwoodie | E04D 1/18 52/173.3 |
| 2006/0053709 A1* | 3/2006 | Kim | E04D 1/125 52/204.52 |
| 2010/0043862 A1* | 2/2010 | Croft | H01L 31/05 136/244 |

FOREIGN PATENT DOCUMENTS

| | | |
|---|---|---|
| JP | 2006120959 | 5/2006 |
| KR | 1019980018462 | 6/1998 |
| KR | 100251069 | 4/2000 |
| KR | 1020020095118 | 12/2002 |
| KR | 200327057 | 9/2003 |
| KR | 100867655 | 11/2008 |
| KR | 1020090085112 | 8/2009 |
| KR | 1020100020448 | 2/2010 |
| KR | 100989599 | 10/2010 |
| KR | 101086467 | 11/2011 |

* cited by examiner

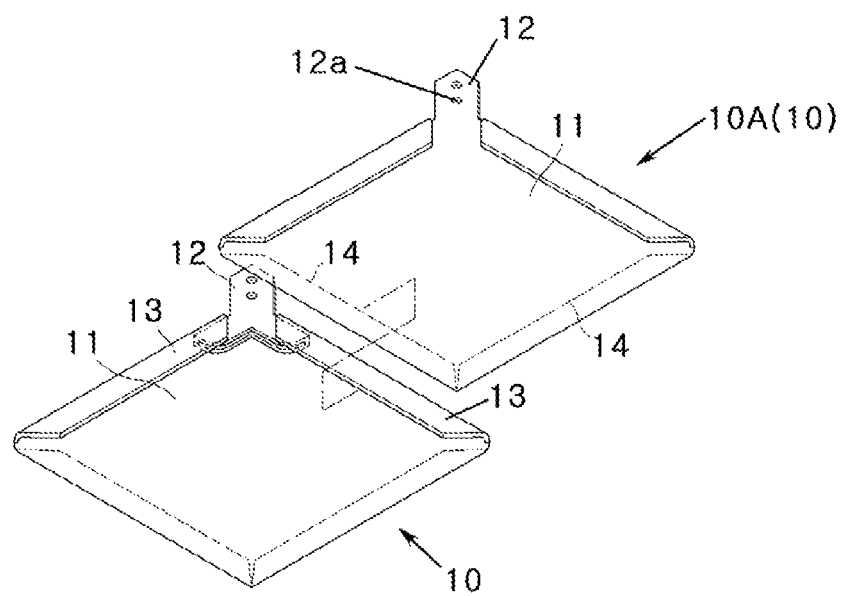

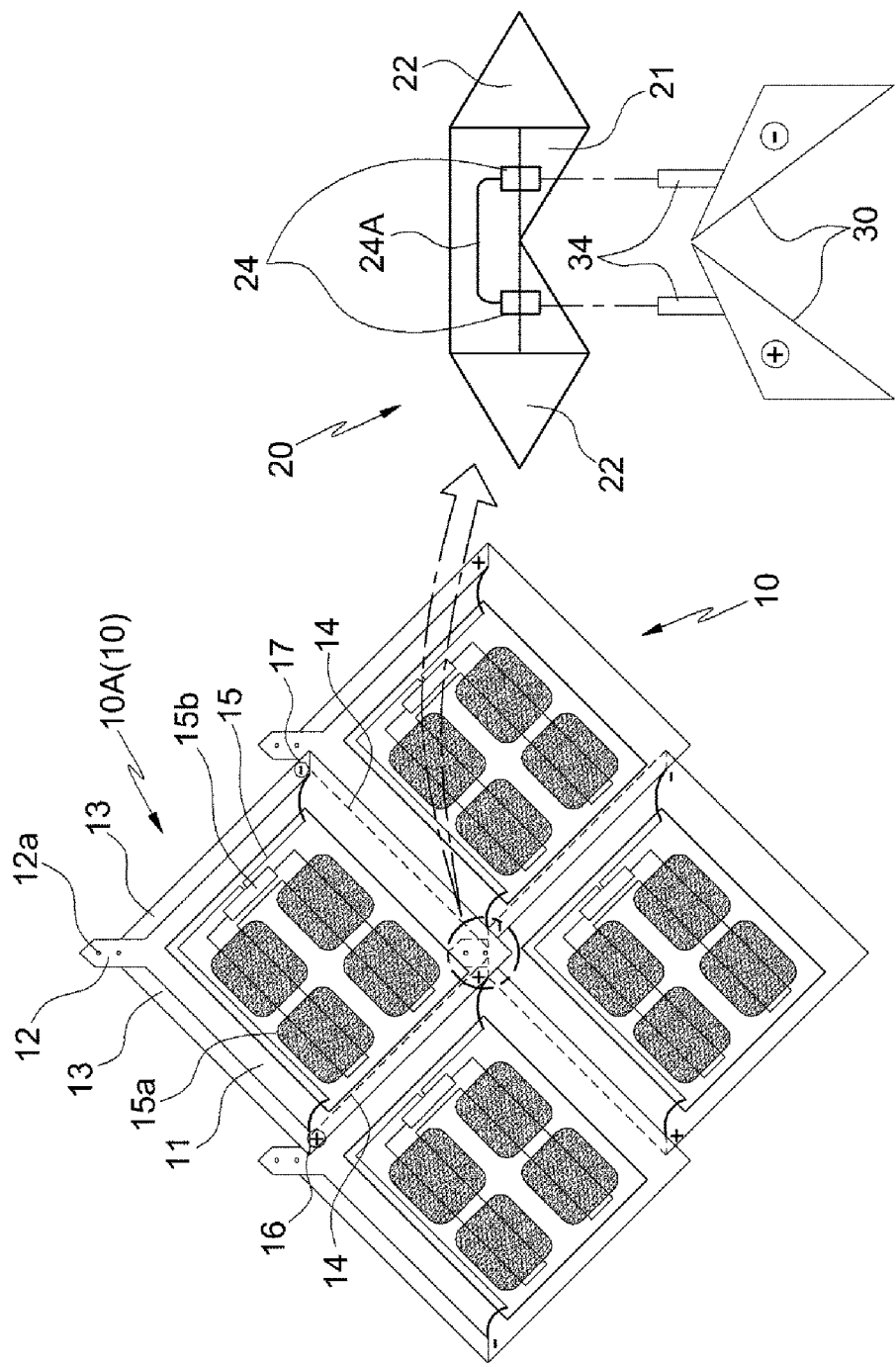

SOLAR CELL MODULE-EQUIPPED PANEL AND EXTERIOR BUILDING MATERIAL USING SAME

TECHNICAL FIELD

The present invention generally relates to a solar cell module-equipped panel and exterior materials for buildings using same. More specifically, the present invention relates to a panel that is usable as an exterior material, especially roofing, for buildings, and to exterior materials for buildings using the same, in which the solar cell module-equipped panel includes a rectangular plate body provided with first and second attachment parts bent upwards and downwards, respectively, thus simplifying the components and facilitating the process by which the solar cell module-equipped panels are installed by enabling the electrical connection between the solar cell modules by means of a simple structural configuration thereof.

BACKGROUND ART

Generally, interior and exterior panels for buildings, especially installed on a roof, are configured to obtain heat-insulating and waterproofing effects. Such panels are conventionally made of stone or metal.

As the use of air conditioning and heating devices has sharply increased due to utilization of various electronic appliances through development in technologies and due to abnormal weather conditions caused by global warming or the like, power consumption has also increased considerably, thus urgently requiring global efforts to solve the problems.

A solution to reduce user cost burden due the increased power consumption, along with solving the above problems is to utilize solar cells.

Solar cells are a representative means for solving problems occurring due to increased power consumption by unlimitedly generating electricity using solar light so as to supply power required to maintain buildings.

Although the generating efficiency of such solar cells has considerably increased due to significant developments in technology, it still has not reached a satisfactory level. Thus, in order to utilize currently available solar cells, a large installation space is required.

In order to solve this spatial constraint, solar cell modules are utilized as exterior materials in buildings by integrally installing them onto a roof, an outer wall, etc. of a building.

Korean Patent No. 10-0869655 (published on Nov. 12, 2008) discloses a solar cell-equipped panel which is usable as an exterior material for buildings, such as materials constituting a roof or an outer wall of a building. The Patent Publication is directed to a solar cell module for a roof panel, which is installed on a roof panel or the like in a building so as to collect solar energy, and a solar energy collecting device using the same.

Further, a solar cell module and a roof material incorporating the same are disclosed in Korean Patent No. 10-0251069 (published on Jan. 10, 2000), wherein the solar cell module includes a photovoltaic device fixed to an reinforcing plate, a plurality of junction boxes provided to the reinforcing plate to draw electric power from the photovoltaic device to the outside, first spacer members having a height higher than the junction box and arranged along opposite sides of the reinforcing plate, and a second spacer member arranged between the junction boxes. In this configuration, when the solar cell module is installed on a roof, the first spacer members are fixed onto a roof board, and a space defined between the roof material and the roof board is exposed to the outside so that the space communicates with the inside of a building at a ridge of the panel.

Further, an energy harvesting system installed onto a roof construction is disclosed in Korean Unexamined Patent Publication No. 10-2009-0085112 (published on Aug. 6, 2009), wherein the energy harvesting system includes one or more solar cell panels fixed to a roof system component, wherein the solar cell panel is installed to the roof system component using a hook-loop fixture means.

Further, a roof incorporating a solar cell is disclosed in Korean Patent No. 10-0989599 (published on Oct. 25, 2010), wherein the roof includes at least one roof material, which includes a plurality of solar cells electrically connected together, a plurality of interconnections connecting the solar cells, and a junction box bonding to the solar cell and embedded with interconnections, wherein adjoining roof materials are coupled together electrically in a male-female connection, thereby improving power output while facilitating construction.

However, all of the described conventional techniques require a separate junction box (space members) to accommodate a plurality of interconnections for supplying electricity generated from the solar cell (module), resulting in spatial constraints, complicated manufacturing, and difficult installation of the roof material (hereinafter generally referred to as a 'panel') due to complex wiring.

DISCLOSURE

Technical Problem

Accordingly, the present invention has been made keeping in mind the above problems occurring in the prior art, and an object of the present invention is to provide a solar cell module-equipped panel that includes a body section surrounded by four sides, two of which are provided with a first attachment part bent upwards and the other two being provided with a second attachment part bent downwards, thus facilitating the manufacture of the panel, and by eliminating a separate space for interconnections, enabling easy installation when the panel is installed as a roof material, while reducing manufacturing cost.

Another object of the present invention is to provide an exterior material for a building, including a plurality of solar cell-equipped panels each having first and second attachment parts coupled with those of the adjacent panel, wherein a solar cell module is connected with a positive electrode and a negative electrode provided at opposite corners of a body section of the panel so that, when installed, the panels are serially connected together, allowing electricity generated from the solar cell modules to flow in a diagonal direction of the body sections. Alternatively, a solar cell module may be connected directly with a positive electrode and a negative electrode provided at opposite ends of one side of a body section of the panel so that, when installed, the panels are serially connected together, allowing electricity generated from the solar cell modules to linearly flow along one sides of the body sections, thereby facilitating the manufacture and assembly of the panels, and by eliminating a separate space for interconnections, enabling easy installation when the panels are installed, while reducing manufacturing and assembling costs.

A further object of the present invention is to provide an exterior material for a building, including a plurality of solar cell-equipped panels and an electrically conductive waterproof assembly provided between connections of respective panels, thereby preventing failure or a decrease in lifetime of the solar cell module caused by penetration of water, such as rainwater, through gaps between the panels, while enabling direct connection and current-carrying between the panels without interconnections therebetween.

Technical Solution

In order to accomplish the above objects, in an aspect, the present invention provides a solar cell module-equipped panel including: a body section having a fixing part on one corner thereof; an attachment section having first and second attachment parts, the first attachment part being bent upwards from two sides of the body section adjacent to the fixing part, and the second attachment part being bent downwards from opposite two sides of the body section separated from the fixing part; and a solar cell module attached on an upper surface of the body section.

In another aspect, the present invention provides an exterior material for a building, including the plurality of solar cell module-equipped panels, wherein the first and second attachment parts of respective panels are coupled with each other, wherein the solar cell module is connected with positive and negative electrodes formed on ends of the first attachment parts, respectively, adjacent to the fixing part of the body section, and wherein the positive and negative electrodes of respective solar cell modules on the coupled panels are mutually serially connected together so that the current-carrying is performed in a diagonal direction of the body sections of the panels.

In a further aspect, the present invention provides an exterior material for a building, including the plurality of solar cell module-equipped panels, wherein the first and second attachment parts of respective panels are coupled with each other, wherein the solar cell module is connected with positive and negative electrodes formed on opposite ends, respectively, of one of the first attachment parts adjacent to the fixing part of the body section, and wherein the positive and negative electrodes of respective solar cell modules on the coupled panels are mutually serially connected together so that the current-carrying is performed in a linear direction along one sides of the body sections of the panels.

The exterior material having the plurality of solar cell module-equipped panels may further be provided, between the first attachment parts of the panel, with a connecting assembly configured both to connect positive and negative electrodes of the panels coupled together in a current-carrying manner, and to prevent water-penetration into the panel through a gap between attachment parts coupled together.

Advantageous Effects

According to the present invention, the solar cell module-equipped panel is provided with an attachment section having a simple structure and having a solar cell module on the upper surface thereof, thereby facilitating the manufacture thereof and reducing the manufacturing cost.

Further, according to the present invention, the exterior material for a building, including the plurality of solar cell-equipped panels each having first and second attachment parts, which are coupled with those of an adjacent panel, wherein the solar cell module is connected with the positive electrode and the negative electrode provided at opposite corners of the body section of the panel so that when installed, the panels are serially connected together, allowing electricity generated from the solar cell modules to flow in a diagonal direction of the body sections. Alternatively, the solar cell module is connected directly with the positive electrode and the negative electrode provided at opposite ends of one side of the body section of the panel so that, when installed, the panels are serially connected together, allowing electricity generated from the solar cell modules to linearly flow along one side of the body sections, thereby facilitating the manufacture and assembly of the panels, and by eliminating a separate space for interconnections, easy installation is facilitated, while reducing manufacturing and assembling costs.

Furthermore, according to the present invention, the exterior material for a building, including the plurality of solar cell-equipped panels and the electrically conductive waterproof assembly provided between connections of respective panels, prevents failure or the like owing to water leakage or a short circuit caused by penetration of water, such as rainwater, through gaps between the panels, while minimizing the connection using wirings, thus ensuring quick and easy installation.

DESCRIPTION OF DRAWINGS

FIGS. 1A, 1B and 1C are an exploded perspective view of a panel according to an embodiment of the present invention;

FIG. 3 is a plan view of the exterior material of the first embodiment, with a major part depicted in an enlarged view.

DESCRIPTION OF THE REFERENCE NUMERALS IN THE DRAWINGS

Figure 1A:
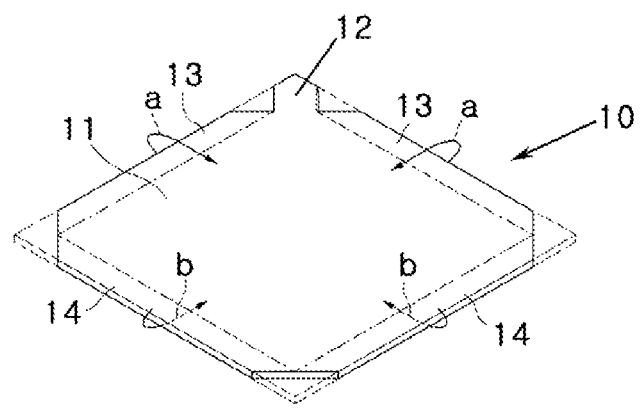

| | |
|---|---|
| 10: Panel | 11: Body section |
| 12: Fixing part | 13: $1^{st}$ attachment part |
| 14: $2^{nd}$ attachment part | 15: Solar cell module |
| 16: Positive electrode | 17: Negative electrode |
| 20: Current-carrying block | 21: Body part |
| 22: Wing part | 23: Protrusion part |
| 24: Coupling part | 30: Connecting block |
| 31: Connection piece | 32: Connecting member |
| 34: Counter coupling part | |

BEST MODE

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise.

It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first~' and 'a second~' are used only for the purpose for distinguishing a constitutive element from another constitutive element, but constitutive elements should not be limited to a manufacturing order, and the terms described in the detailed description of the invention may not be consistent with those described in the claims.

Figure 7:
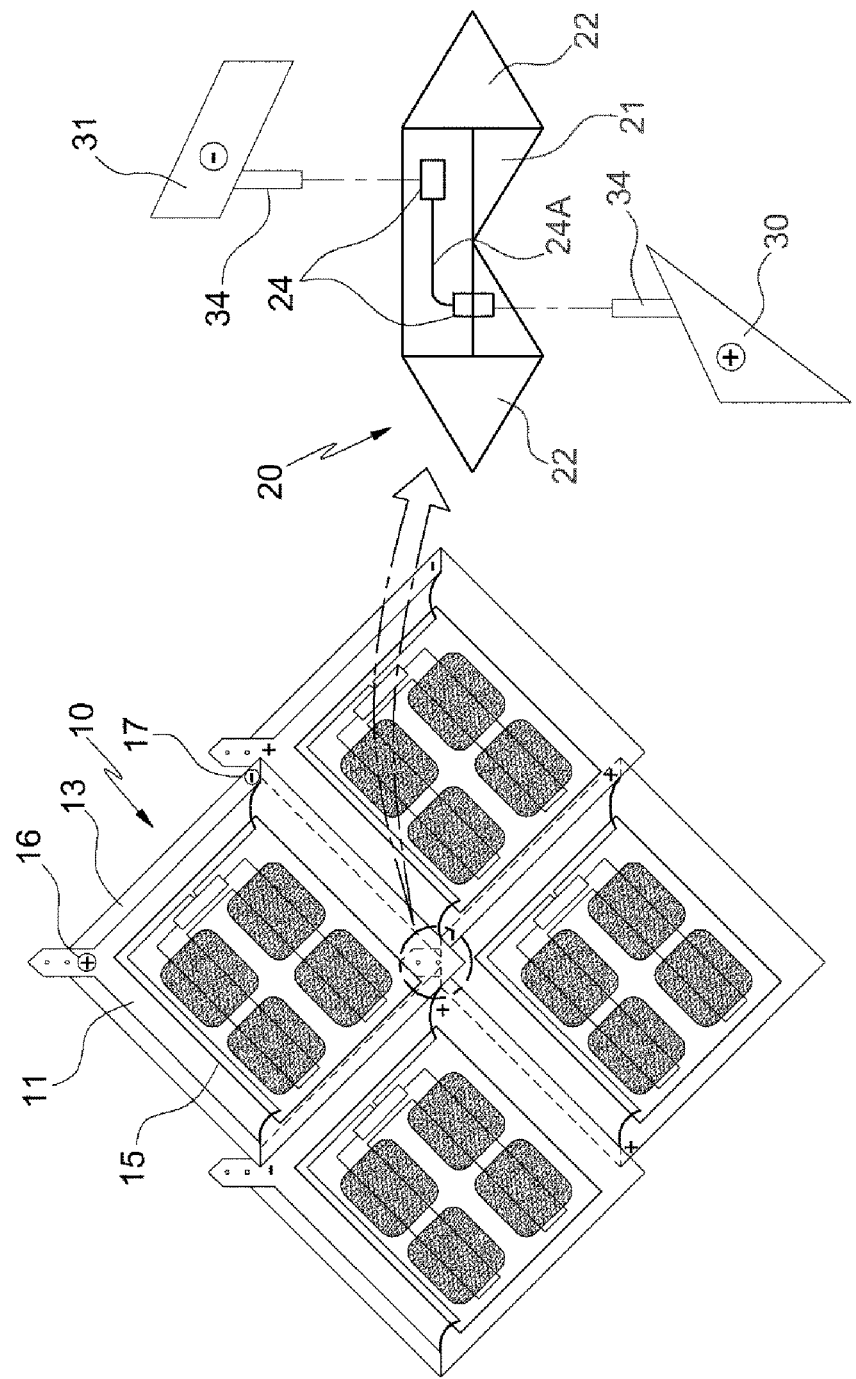
FIG. 7 is a plan view of the exterior material of the second embodiment, with a major part depicted in an enlarged view.

For convenience of the description of a solar cell module-equipped panel and an exterior material in a building using the same according to the present invention, when an approximate direction rather than a precise direction is specified with reference to FIGS. 1A, 3, and 7, a lower side is determined based on a direction to which gravity is applied, up and down directions and right and left directions are determined based on the lower side, and directions a and b are defined as upper and lower surfaces, respectively.

Further, in the description of the solar cell module-equipped panel and the exterior material in a building using the same according to the present invention, the exterior material in a building means an exterior material that is capable of being directly utilized as a roof or an outer wall of a building being constructed, or that is capable of additionally using a solar cell module on a constructed building. Here, for convenience of the explanation in the following detailed description, the exterior material will be representatively described with reference to the roofing, but the present invention is not limited to those described in the detailed description.

Further, it is noted that the solar cell module is omitted in FIGS. 1A, 1B, 1C, 2, and 6 for convenience of description.

Hereinbelow, a solar cell module-equipped panel and an exterior material in a building using the same according to the present invention will be described with reference to the accompanying drawings.

Figure 1B:
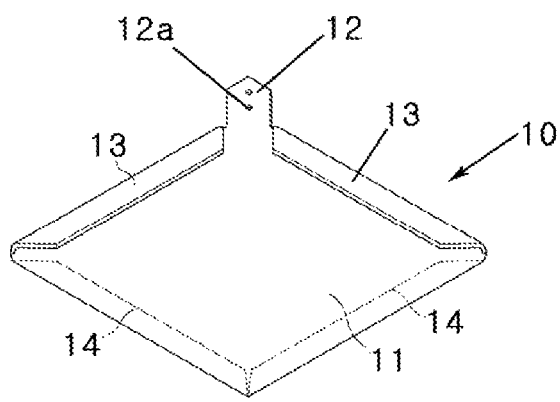

As shown in FIGS. 1A, 1B and 1C, the solar cell module-equipped panel 10 includes a body section 11 having a fixing part 12 on one corner thereof; an attachment section having first and second attachment parts 13 and 14, the first attachment part 13 being bent upwards from two sides of the body section 11 adjacent to the fixing part 12, and the second attachment part 14 being bent downwards from opposite two sides of the body section separated from the fixing part; and a solar cell module 15 (FIGS. 3 and 7) attached on an upper surface of the body section 11.

The configuration of the body section and the attachment section may employ a clamp-type panel for an interior/exterior material in a building, which is disclosed in Korean Utility Model Registration No. 20-0327057 (published on Sep. 5, 2003) owned by the applicant. The solar cell module-equipped panel will now be described in detail.

The body section may be entirely of polygons (e.g. a regular triangle, a hexagon, etc.) in addition to a rectangle. If the body section is not rectangle, but polygonal, the number (if it is a triangle, first and second attachment parts may be respectively formed on two sides adjacent to the fixing part) and the position (if it is hexagonal, the first attachment part is formed on two sides adjacent to the fixing part, and the second attachment part is formed on two sides opposite to the former two sides) of the first and second attachment parts may be changed in a variety of other forms, which may be modified, varied, and substituted by those skilled in the art.

The panels 10 may be sequentially connected and coupled in a diagonal direction of the body section 11 by conforming the diagonal direction of the body section 11 to the vertical or horizontal direction of the roofing or an outer wall of a building.

Further, it is possible to arrange and coupled the panels in a row rather than in the diagonal direction according to the shapes of the buildings.

The fixing part 12 of the body section 11 formed on one corner thereof may be provided with a through-hole 12a so as to engage with other fixtures by means of a screw, nail or the like when the panels are installed onto a roof.

As shown in FIG. 1A, the first attachment part 13 is formed by properly cutting four corners of the panel 10 (as indicated by a dotted line) and bending two sides formed around the fixing part 12, i.e. two sides adjacent to the fixing part 12, upwards from and parallel with the upper surface of the body section 11.

Further, the second attachment part 14 is formed by bending the other two sides opposite to the first attachment part 13, i.e. two sides separated from the fixing part 12, downwards from and parallel with the lower surface of the body section 11.

As shown in FIG. 1C, the first attachment part 13 of the panel 10 is coupled and connected with the second attachment part 14 of adjacent panel 10A. The plurality of panels are repeatedly coupled together in such a coupling manner, thereby forming an exterior material in a building according to the present invention.

That is, after one panel 10 is fixed to a roof of a building at the fixing part 12, another panel 10A is fixed to the former panel by inserting the second attachment part 14 of the latter panel 10A into the first attachment part 13 of the former panel 10 and then fixing the latter panel to the roof using the fixing part 12 of the latter panel. The panels are successively and repeatedly assembled together in such a manner, thereby easily forming an exterior material for a building according to the present invention.

The panel 10 is made of iron, stainless steel, or the like. Also, the panel may be formed from a relatively elastic material.

Further, as shown in FIG. 3, the solar cell module 15 coupled onto the upper surface of the body section 11 may include a light-receiving part 15a that receives sun light, an energy supply part 15b that is configured to supply electricity generated from the light-receiving part 15a to a separate power supply or storage unit, and the like.

The solar cell module 15 serves to produce electric energy using a photoelectric effect in such a manner that, when receiving sun light, an n-type semiconductor and a p-type semiconductor (light-receiving part 15a) produce electrons and holes, respectively, and the generated holes are moved to an electrode (energy supply part 15b), thus providing electric energy.

The solar cell module 15 includes a crystalline solar cell, a thin-film solar cell (e.g. a copper indium gallium selenide (CIGS)), a next-generation solar cell (e.g. dye-sensitized solar cell), etc. Considering manufacturing cost, volume, and the like, a thin-film solar cell, which is formed by depositing a thin-film chemical material on a substrate such as glass, plastic, or the like, is preferable.

The semiconductor forming the light-receiving part 15a may include a variety of semiconductors including a silicon semiconductor, a compound semiconductor, and the like.

The light-receiving part 15a of the solar cell module 15 is provided with a plurality of modules having a plurality of unit cells each generating electricity.

The term 'the solar cell module 15' used herein is not a module that is generally used as a unit cell, but a module that indicates entire solar cells incorporated in a single panel 10.

An interconnection or wiring serving to connect the light-receiving part 15a or the energy supply part 15b in the solar cell module 15 may be formed by printing or depositing a copper thin-film pattern. In addition, other methods available for a solar cell may be used.

The light-receiving part 15a and the energy supply part 15b are connected together in a serial or parallel connection, thereby supply electric energy.

Here, as described before, in the exterior material consisting of the plurality of panels 10 coupled together, an interconnection is required to carry electric energy between the panels.

However, according to the present invention, since the panels 10 are connected with a separate electric supply or storage unit or the like while being serially connected together, the exterior material for a building may be easily installed and maintained by assembling the solar cell module-equipped panels without a separate interconnection (wiring).

Figure 2:
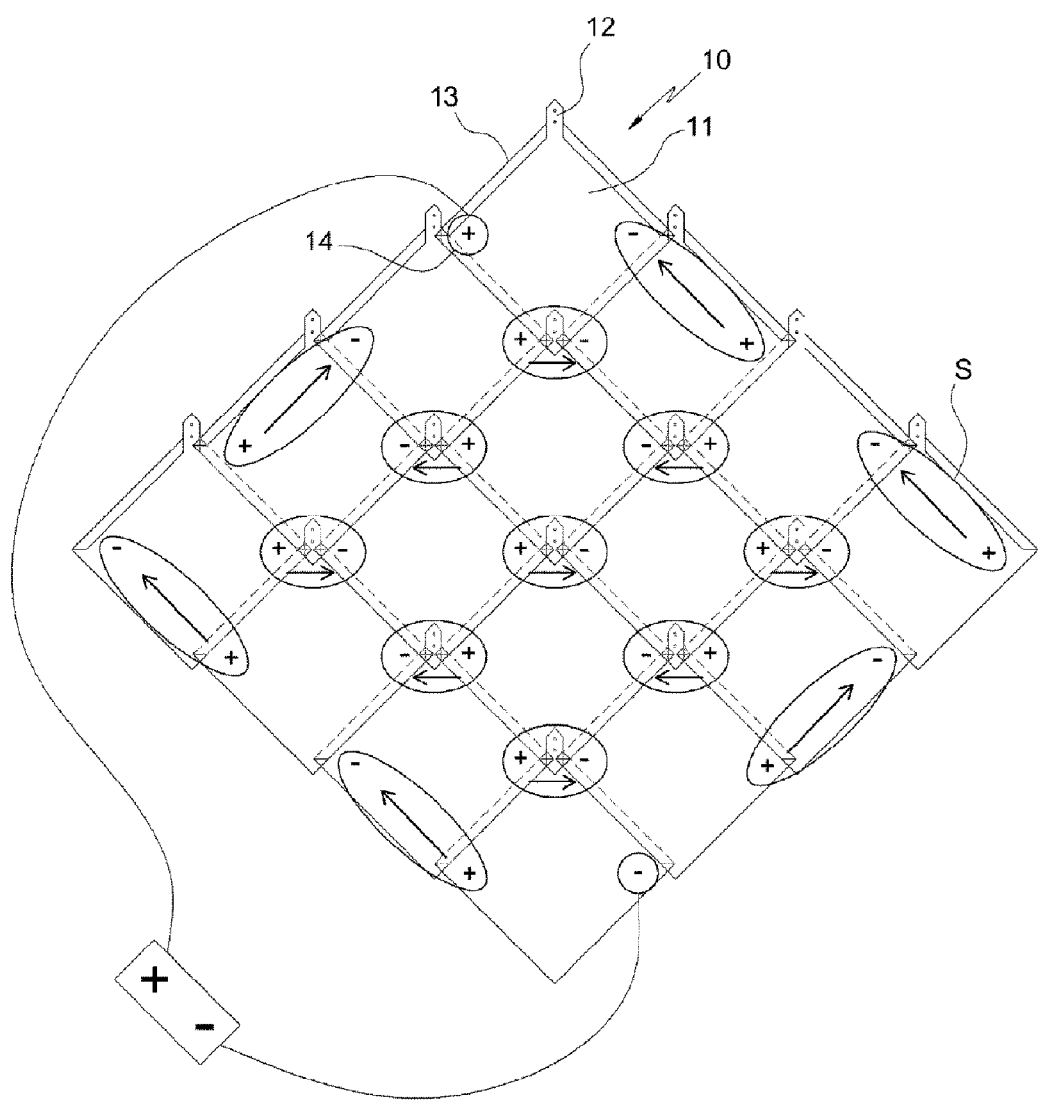
FIG. 2 is a plan view of a first embodiment of an exterior material for a building according to the present invention.

As shown in FIG. 2 illustrating an exterior material for a building according to a first embodiment of the present invention, the solar cell module 15 is electrically connected between positive and negative electrodes provided at ends of first attachment parts 13 adjacent to the fixing part 12 of the body section 11.

Further, positive and negative electrodes of adjacent solar cell modules in panels 10 are correspondingly serially connected together so that current-carrying direction is formed in a diagonal direction of the body sections 11 of the panels 10.

That is, as shown with arrows in FIG. 2, electric energy generated by respective panels 10, particularly, the solar cell modules 15 on respective panels 10, is collected in positive and negative electrodes on the outermost sides thereof, and the positive and negative electrodes are connected with a separate energy supply or storage unit or the like by means of a wiring or the like, thereby carrying electric energy therebetween.

While FIG. 2 shows only positive (+) and negative (−) electrodes without detailed construction of the solar cell panel 10 for convenience of description, as shown in FIG. 3, the solar cell module 15 of the present invention may be configured such that a light-receiving part 15a for generating electric energy and an energy supply part 15b for carrying generated electric energy are separately provided in a parallel connection mode (FIG. 3 representatively shows that the light-receiving parts 15a are serially connected). Thus, energy transfer according to the present invention is not limited to that shown in FIG. 2.

Further, the positive (+) and negative (−) electrodes shown in FIG. 2 are illustrated for convenience of description, so they may be provided on either the body section or the attachment section of the panel 10.

Since the exterior material consisting of solar cell module 15-equipped panels 10 according to the present invention aims at providing convenience, simple installation and easy maintenance by eliminating a separate interconnection for transfer of electric energy, the positive (+) and negative (−) electrodes are preferably provided at ends of the first attachment parts 13 adjacent the fixing part 12 of the body section 11.

The current-carrying direction shown in FIG. 2 may of course be reversed by counter configuration of the positive (+) and negative (−) electrodes.

The serial connection between the panels 10 enables electric interconnection between the panels 10 to be omitted, thereby providing simplified structure, reduced manufacturing cost, simple installation and easy maintenance.

To this end, the present invention may preferably include a connecting assembly electrically connecting the positive (+) and negative (−) electrodes of the panels 10 interconnected together around the first attachment parts 13 adjacent to the fixing part 12 of the panel 10.

The connecting assembly preferably serves both to perform current-carrying between the panels and to prevent water (e.g. rain water) penetration into the exterior material through gaps between the interconnected panels 10, thereby preventing water leakage into a building and a short circuit, and a possible fire caused therefrom.

To this end, as shown in FIGS. 4A, 4B 5A, and 5B, the connecting assembly includes: a current-carrying block 20, which includes a body part 21, wing parts 22 formed on opposite sides of the body part 21 to be inserted into the first attachment parts 13 of the panel 10, and a protrusion part 23 protruding from the upper surface of the body part 21;

a connecting block 30 that is fixed to the second attachment part 14 and is coupled to the current-carrying block 20; and a current-carrying means for enabling mutual current-carrying between the connected panels 10.

Figure 4A:
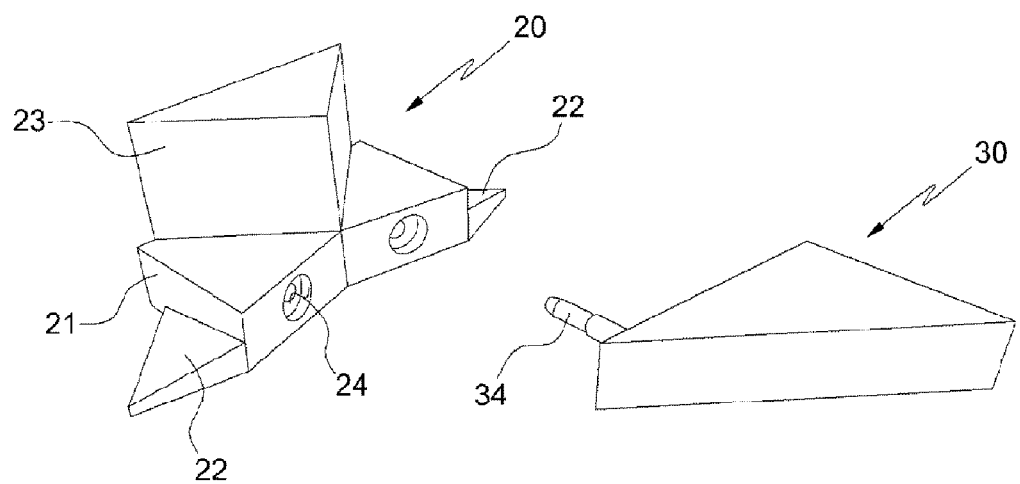
FIGS. 4A and 4B show the assembly of a waterproof assembly of the exterior material of the first embodiment in perspective views.
Figure 4B:
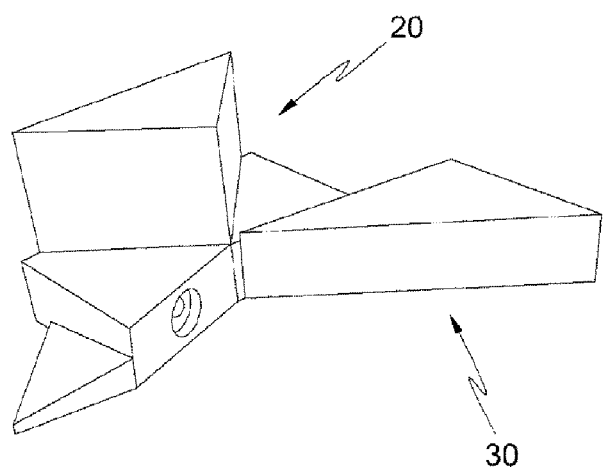
Figure 5A:
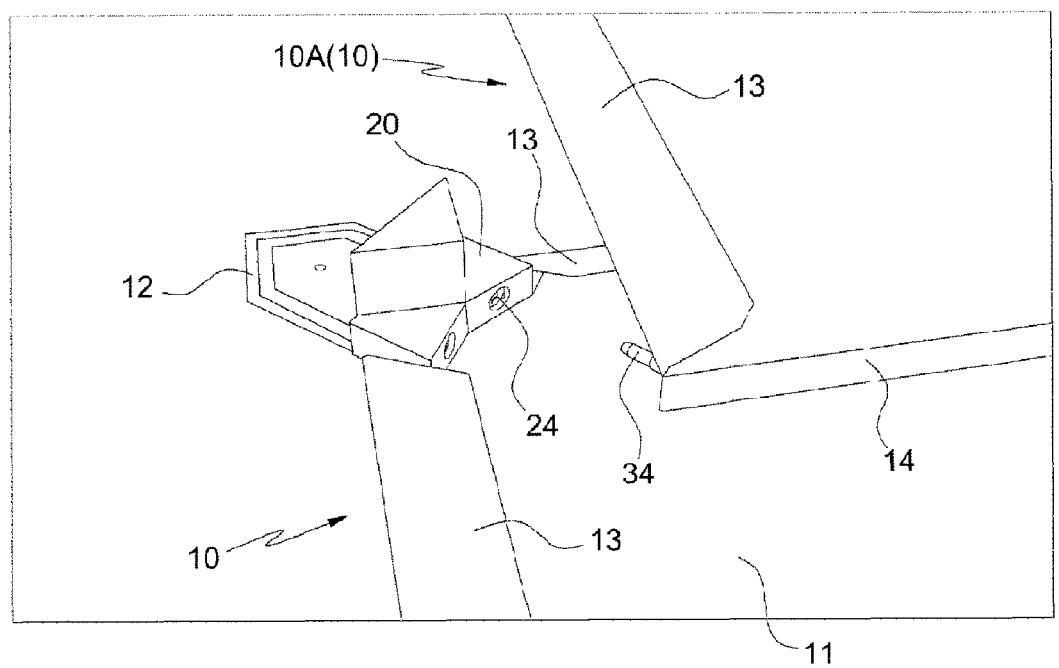
FIGS. 5A and 5B show the connection relation of the exterior material of the first embodiment.
Figure 5B:
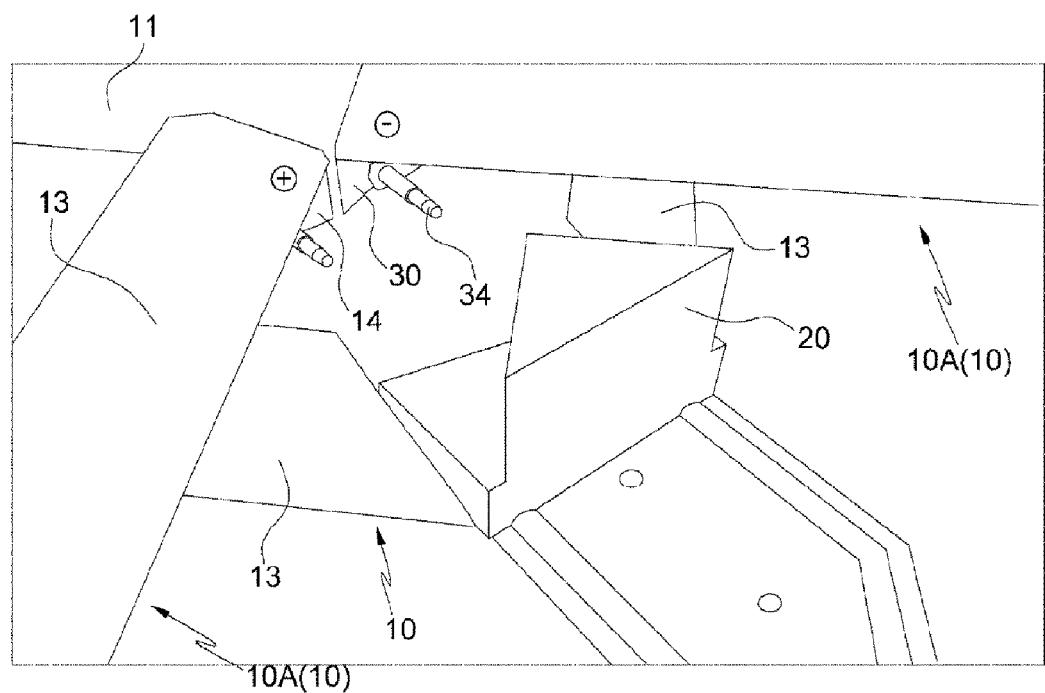
Figure 6:
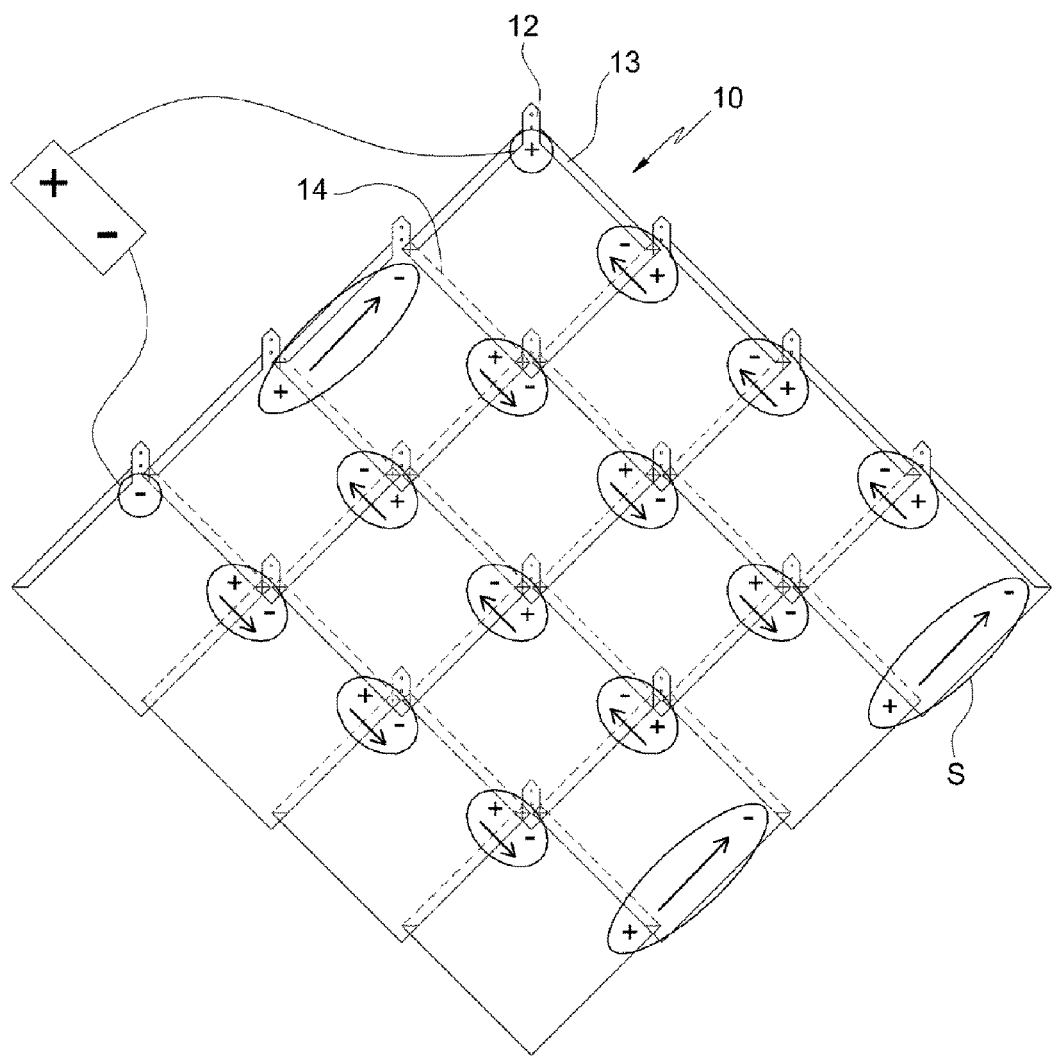
FIG. 6 is a plan view of a second embodiment of an exterior material in a building according to the present invention.

FIGS. 4A and 4B show only the connecting assembly without the panel for convenience of description, and the connection relation with the panel is shown in FIGS. 5A and 5B.

The current-carrying block 20 may be formed from an elastic material such as rubber, synthetic resin, or the like, in order to provide a waterproofing property as well as to prevent water-penetration by forming the current-carrying block 20 slightly larger by a certain amount of volume such that, when inserted into gaps between the panels 10, they can be completely interference-fitted into the gaps, which may have different manufacturing tolerances.

The lower side of the body part 21 has a central V-type notch so that it is closely fitted with a contact surface (the upper side of the connecting block 30)) of the connecting block 30 closely fixed to the second attachment part 14 of the panel 10.

The protruding part 23 serves both to function as a grip that is held by a user's fingers upon interference-fitting of the current-carrying block 20 and to seal the gap with the panel assembled at a position upper than the current-carrying block-coupled panel 10.

The current-carrying means for current-carrying between the panels 10 includes: a pair of mutually electrically connected coupling parts 24 formed on the lower side of the body part 21 of the current-carrying block 20; and a counter coupling part 34 that is formed on the connecting block 30 as a counter member corresponding to the coupling part such that it is electrically connected with the positive (+) or negative (−) electrode.

The mutual coupling parts are of course formed of a mutually current-carrying material.

The coupling part and the counter coupling part may be of various coupling structures. Preferably, they include a female-type coupling part 24 and a male-type coupling part 34, respectively.

Although FIGS. 3 to 5B show that the pair of female-type coupling parts 24 are formed in the lower side of the body part 21, and the male-type coupling part 34 is correspondingly formed on the connecting block 30, the configuration opposite to the former configuration may also be possible.

The pair of female-type coupling parts 24 should be mutually electrically connected together in the body part 21. To this end, as schematically shown with a partially-enlarged view of FIG. 3, a current-carrying ribbon 24A may be provided for mutual electrical connection between the female-type coupling parts 24 in a pair.

The current-carrying ribbon 24A may be formed in various forms, such as a high-conductive copper wire, a thin metal sheet or the like.

Preferably, the electrical connection between the male-type coupling part 34 and the positive (+) or negative (−) electrode of the panel 10 may also be performed by the current-carrying ribbon 24A in the connecting block 30.

Here, as shown in FIG. 2, current-blocking regions S may be between the panels 10 coupled at the outermost sides.

The current-blocking regions S may switch to current-carrying regions by means of a separate electric wire or the like. More preferably, the connecting block 30 may be modified so as to correspond to the first attachment parts 13 of some of the panels 10 positioned at the outermost side, that is, to have the same shape as the gap between the first attachment parts 13, with the male-type coupling part 34 allowed to face downwards, and the current-carrying block may be modified such that one of wing parts 22 is removed, the body part 21 is extended to correspond to the modified connecting block and the female-type coupling part 24 to be coupled with the male-type coupling part 34 is provided on the upper side thereof, thereby enabling switching of the current-blocking regions to the current-carrying regions as well as preventing water-penetration only with the coupling with the modified current-carrying block.

Although not shown, the modified current-carrying block 20 and the modified connecting block 30 may be changed and substituted as the simple structure and shape of the above-mentioned current-carrying block 20 and the connecting block 30, as sufficiently reproducible by those skilled in the art (ordinary skilled person in the art).

Further, the current-blocking regions may switch to the current-carrying regions more simply by employing an assembly according to a following second embodiment.

Therefore, according to the present invention, with the configuration that the solar cell module 15-equipped panels 10 are installed with minimized provision of interconnection such as an electric wire, the exterior material of a building may be easily installed.

The second embodiment of the present invention will now be described.

As shown in FIG. 7 showing the second embodiment of the present invention, a solar cell module 15 is connected to positive (+) and negative (−) electrodes provided on opposite ends of one of first attachment parts 13 adjacent to a fixing part 12 of a body section 11.

Preferably, positive (+) and negative (−) electrodes of respective solar cell modules 15 on adjacent panels 10 are correspondingly serially connected so that the current-carrying is performed in a linear direction along one sides of the body sections 11 of the panels 10.

That is, in the first embodiment as shown in FIGS. 5A and 5B, the current-carrying is performed between adjacently connected panels 10 and 10A through the connecting assembly having the current-carrying means.

Figure 8A:
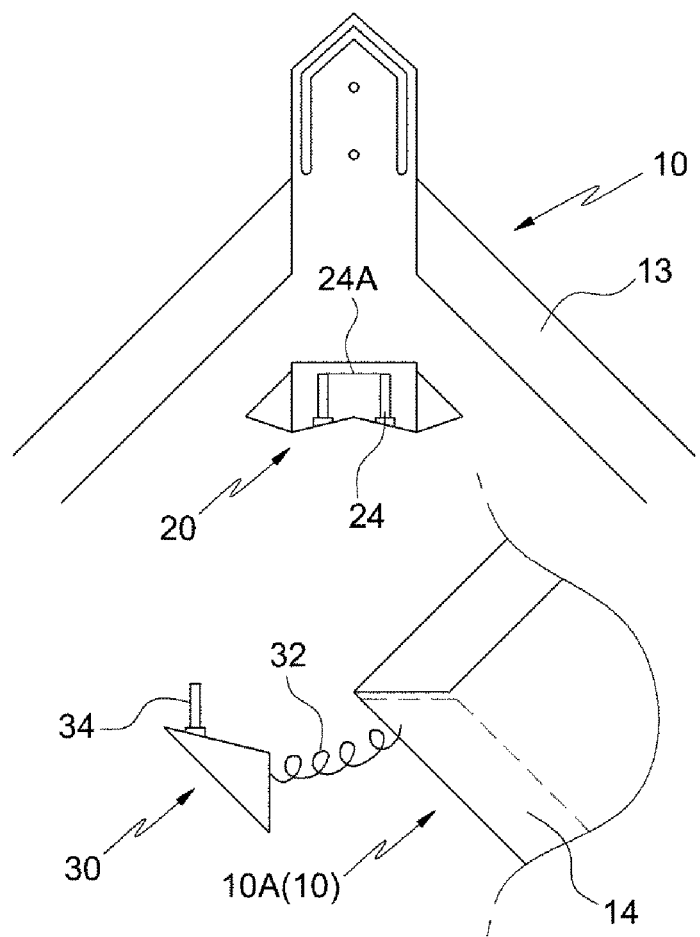
FIGS. 8A and 8B show the assembly of the exterior material of the second embodiment in plan views.
Figure 8B:
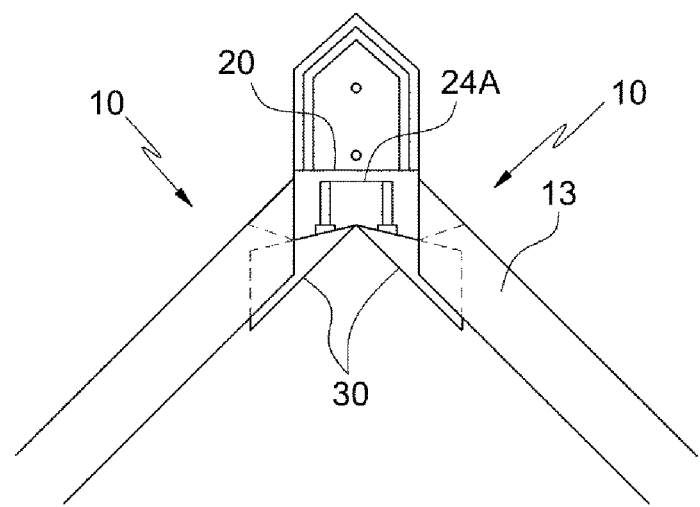
Figure 9A:
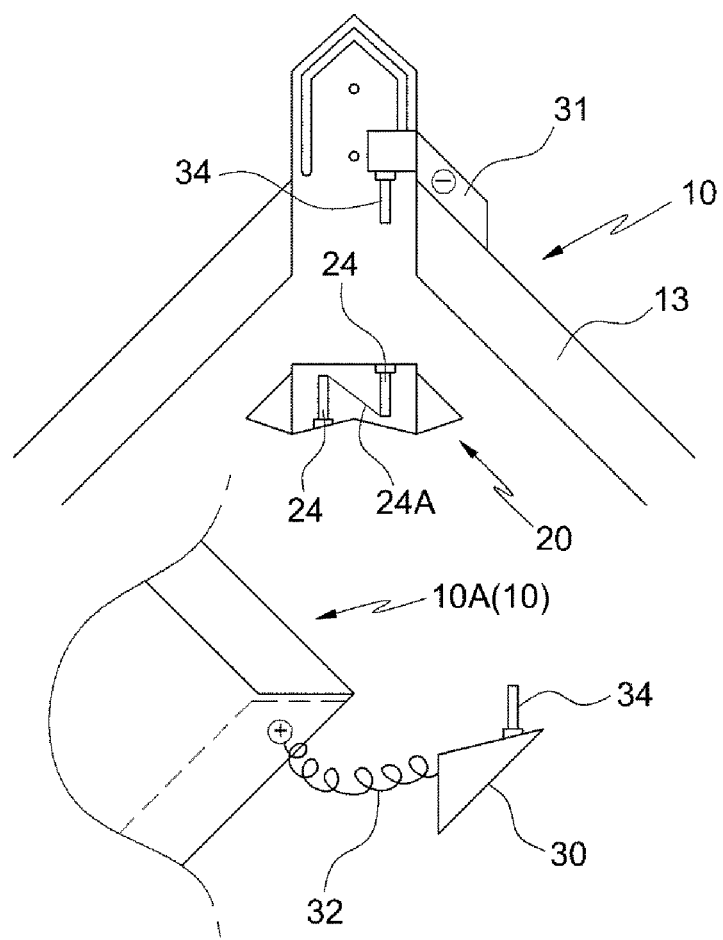
FIGS. 9A and 9B schematically show a modified embodiment of a connection block according to the present invention in plan views.
Figure 9B:
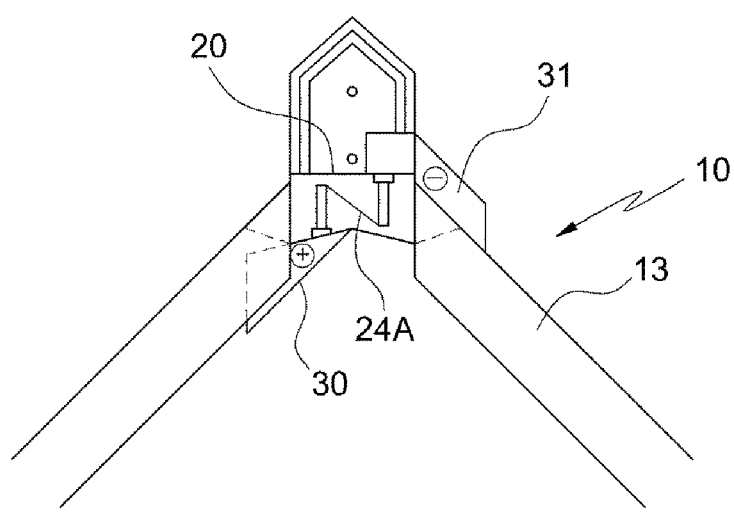

In contrast, in the second embodiment as shown in FIGS. 8A and 8B, the current-carrying is performed between one panel 10 and one 10A of two panels 10 connected to the former panel 10, thereby minimizing the current-blocking regions (S; see FIG. 6) produced in the first embodiment.

To this end, as shown in FIG. 7 with a partially enlarged view and in FIGS. 8A and 8B, the current-carrying means includes: a pair of mutually electrically connected coupling parts provided on the lower side and the upper side, respectively, of the body part 21 such that they are electrically connected with a positive (+) or negative (−) electrode of the panel 10;

a counter coupling part formed on the connecting block 30 correspondingly to the coupling part on the lower side of the body part 21 such that it is electrically connected with the positive (+) or negative (−) electrode of the panel 10; and an additional coupling part formed on a connection piece extending towards the fixing part 12 from the first attachment part 13 correspondingly to the coupling part on the upper side of the body part 21 such that it is electrically connected with the positive (+) or negative (−) electrode of the panel 10.

In the partially enlarged view of FIG. 7, the panel is omitted for convenience of description, in FIG. 8B showing the state after coupling, other panels to be coupled are also omitted for convenience of description, and the configuration of the detachable connecting block will be described later.

That is, the connection piece 31 having the counter coupling part electrically communicating with the positive (+) or negative (−) electrode of the panel is formed on one of the first attachment parts 13 (the attachment part 13 on the right side in FIGS. 8A and 8B) of the panel 10, so that, when the current-carrying block 20 is coupled to the panel 10, the coupling parts are mechanically and electrically connected together.

Further, when another panel 10A (the left side panel in FIGS. 8A and 8B) is coupled to the former panel 10, the counter coupling part of the connecting block 30 on the second attachment part 14 is coupled with the coupling part on the lower side of the body part 21 of the current-carrying block 20 so as to enable current-carrying between adjacent panels along one side of the collected panels, thereby enabling linear serial connection between panels along one sides of the body sections according to the second embodiment.

The current-carrying between the counter coupling part of the connection piece 31 and the positive (+) or negative (−) electrode on the first attachment part 13 of the panel 10 may be performed by the current-carrying ribbon 24A. As shown in FIGS. 6 to 8B, the coupling parts may include a female-type coupling part 24 and a male-type coupling part 34 as in the first embodiment.

The other configuration in the second embodiment is similar to that of the first embodiment, so a detailed description thereof will be omitted for convenience of description.

Another embodiment of the connecting block 30 will now be described.

The connecting block 30 may be detachably coupled to the second attachment part 14.

A detachable feature of the connecting block 30 enables its flexible connection in the current-carrying direction, i.e. the installing direction of the panels for forming the exterior material, according to the first and second embodiments, thereby ensuring worker convenience.

Although not shown in the drawings, the connection piece 31 may also be detachably coupled to the first attachment part 13 of the panel 10.

Here, the connecting block 30 may preferably be formed from a material such as elastic rubber, plastic, or the like as in the current-carrying block 20.

The current-carrying between the counter coupling part of the connecting block 30 and the positive (+) or negative (−) electrode of the first attachment part 13 of the panel 10 may be performed in a variety of manners such as touch-type.

As shown in FIGS. 8A, 8B 9A, and 9B, it is preferred that a connecting member 32 be further provided to the connecting block 30 to enable current-carrying with respect to the positive (+) or negative (−) electrode while being engaged with the second attachment part 14.

The connecting member 32 may include a separate connecting element such as an electric wire for ensuring easy coupling and a current-carrying function. The connecting member may preferably be formed from a conductive flexible material.

While the solar cell module-equipped panel having a specified shape and structure, and the exterior material for a building using the same have been mainly described with reference to the embodiments and accompanying drawings, the embodiments may be changed, modified, and substituted in a diverse forms by the skilled in the art, and it should be interpreted that such changes, modifications, and substitutions fall within the scope of the present invention to be protected.

The invention claimed is:

1. An exterior building material comprising: a plurality of panels each equipped with a solar cell module,
wherein each panel includes:
a rectangular body section having an upper surface on which the solar cell module is attached, and a bottom surface opposite to the upper surface;
a fixing part formed at a corner of the rectangular body section;
two first attachment parts formed along two neighboring edge portions of the rectangular body section, the two neighboring edge portions being bent toward the upper surface to form a first gap with the upper surface;
two second attachment parts formed along another two neighboring edge portions of the rectangular body section, the another two neighboring edge portions being opposite to the two neighboring edge portions and being bent toward the bottom surface to form a second gap with the bottom surface;
a current-carrying block attached on the upper surface of the panel at a corner between the two first attachment parts, wherein the current-carrying block includes: a body part; two wing parts formed at two opposite sides of the body part, each wing part configured to be tightly inserted into the first gap; and two coupling parts formed between the two wing parts and in parallel with the upper surface of the panel;
a connection block attached on the bottom surface of the panel at a corner at which an end of one of the first attachment parts and an end of one of the second attachment parts is formed, the connection block including a counter coupling part; wherein the two neighboring edge portions of each panel are configured to be inserted into the second gap of a neighboring panel of the plurality of panels; wherein the counter coupling part of each panel is configured to be coupled with one of the two coupling parts of the current carrying block of a neighboring panel of the plurality of panels.

2. The exterior building material according to claim 1, wherein the current-carrying block of each panel further includes: a protrusion part on top of the body part.

3. The exterior building material according to claim 1, wherein the two coupling parts of each panel are female coupling parts and the counter coupling part of each panel is a male coupling part.

* * * * *